United States Patent
Fukaya et al.

(10) Patent No.: US 9,829,129 B2
(45) Date of Patent: Nov. 28, 2017

(54) FITTING, FERRULE, AND FERRULE MANUFACTURING METHOD

(71) Applicant: IHARA SCIENCE CORPORATION, Minato-ku, Tokyo (JP)

(72) Inventors: Shinji Fukaya, Tokyo (JP); Osamu Yamaguchi, Tokyo (JP); Tatsuya Murakawa, Tokyo (JP)

(73) Assignee: IHARA SCIENCE CORPORATION, Tokyo (JP)

( * ) Notice: Subject to any disclaimer, the term of this patent is extended or adjusted under 35 U.S.C. 154(b) by 280 days.

(21) Appl. No.: 14/418,525

(22) PCT Filed: May 20, 2013

(86) PCT No.: PCT/JP2013/063906
§ 371 (c)(1),
(2) Date: Jan. 30, 2015

(87) PCT Pub. No.: WO2014/020968
PCT Pub. Date: Feb. 6, 2014

(65) Prior Publication Data
US 2015/0167870 A1    Jun. 18, 2015

(30) Foreign Application Priority Data
Jul. 31, 2012   (JP) ................................. 2012-169271

(51) Int. Cl.
*F16L 17/00* (2006.01)
*F16L 19/10* (2006.01)
(Continued)

(52) U.S. Cl.
CPC .............. *F16L 19/10* (2013.01); *B21D 41/04* (2013.01); *B21D 53/16* (2013.01); *Y10T 29/49446* (2015.01)

(58) Field of Classification Search
USPC ............................... 285/343, 342, 247, 382.7
See application file for complete search history.

(56) References Cited

U.S. PATENT DOCUMENTS 1,698,999 A    1/1929   Hostersall
1,781,222 A  * 11/1930  Fischer ................... F16L 19/10
                                                       285/340
(Continued)

FOREIGN PATENT DOCUMENTS

CN    101395420    3/2009
CN    101821541    9/2010
(Continued)

OTHER PUBLICATIONS

International Search Report of PCT/JP2013/063906 dated Jun. 6, 2013.
(Continued)

*Primary Examiner* — Aaron Dunwoody
(74) *Attorney, Agent, or Firm* — DLA Piper LLP US

(57) ABSTRACT

A fitting includes: a first member; a second member coupled by screw coupling with the first member; and a ferrule placed in an accommodation space between the first member, the second member, and a pipe. The ferrule has a rising portion including a first end portion, a pressed portion located closer to a second end portion than the rising portion, and an intermediate portion including a portion where an inner diameter is greater than the first end portion and the second end portion, the intermediate portion connecting together the rising portion and the pressed portion. The first member has a first tapered inner circumferential surface, which is an inner circumferential surface having a tapered shape, to be in contact with the first end portion of the ferrule. The second member has a pressing portion for pressing at least a portion of the pressed portion of the ferrule. The accommodation space provides a clearance for (Continued)

accommodating the ferrule and allowing the rising portion to rise so as to increase an angle of the rising portion.

8 Claims, 11 Drawing Sheets

(51) Int. Cl.
    *B21D 41/04*    (2006.01)
    *B21D 53/16*    (2006.01)

(56) References Cited

U.S. PATENT DOCUMENTS

| | | | |
|---|---|---|---|
| 1,799,246 A * | 4/1931 | Recker | F16L 27/12 |
| | | | 277/622 |
| 2,255,673 A * | 9/1941 | McDermett | F16L 19/06 |
| | | | 285/149.1 |
| 2,288,506 A * | 6/1942 | White | F16L 19/086 |
| | | | 285/341 |
| 2,343,922 A | 3/1944 | Parker | |
| 3,007,721 A * | 11/1961 | Schmohl | F16L 19/10 |
| | | | 277/622 |
| 3,107,108 A * | 10/1963 | Greene | F16L 19/083 |
| | | | 285/341 |
| 3,248,136 A * | 4/1966 | Brozek | F16L 19/10 |
| | | | 285/341 |
| 3,393,931 A * | 7/1968 | Wurzburger | F16L 19/10 |
| | | | 285/341 |
| 3,499,671 A * | 3/1970 | Osborne | F16L 19/10 |
| | | | 285/341 |
| 3,888,521 A * | 6/1975 | O'Sickey | F16L 19/10 |
| | | | 285/341 |
| 4,019,762 A * | 4/1977 | Eidelberg | F16L 19/086 |
| | | | 285/340 |
| 4,159,134 A * | 6/1979 | Shemtov | F16L 19/08 |
| | | | 285/322 |
| 4,508,466 A * | 4/1985 | Dennis | F16B 7/149 |
| | | | 285/340 |
| 2003/0025331 A1 | 2/2003 | Williams | |
| 2004/0066040 A1 | 4/2004 | Bennett | |
| 2004/0212192 A1 | 10/2004 | Williams | |
| 2005/0194785 A1* | 9/2005 | Shemtov | F16L 19/0212 |
| | | | 285/382.7 |
| 2005/0264005 A1 | 12/2005 | Norman | |
| 2007/0164563 A1 | 7/2007 | Arstein | |
| 2007/0170723 A1 | 7/2007 | Asakawa | |
| 2007/0252388 A1 | 11/2007 | Ochiai | |
| 2008/0007050 A1 | 1/2008 | Williams | |
| 2009/0008930 A1 | 1/2009 | Nakata | |
| 2011/0277309 A1 | 11/2011 | Bearer | |
| 2011/0298211 A1 | 12/2011 | Williams | |
| 2013/0154261 A1 | 6/2013 | Bennett | |
| 2015/0362101 A1 | 12/2015 | Bearer | |

FOREIGN PATENT DOCUMENTS

| | | |
|---|---|---|
| CN | 102253140 | 11/2011 |
| DE | 1255415 | 11/1967 |
| DE | 4304534 | 8/1994 |
| EP | 2281474 | 2/2011 |
| FR | 1297897 | 7/1962 |
| GB | 409692 | 5/1934 |
| GB | 881304 | 11/1961 |
| JP | S51-003917 | 1/1976 |
| JP | S55-106788 | 8/1980 |
| JP | 55-181082 Y | 12/1980 |
| JP | S56-019516 | 5/1981 |
| JP | 58-15745 Y2 | 1/1983 |
| JP | H02-043073 | 9/1990 |
| JP | H11-159669 | 6/1999 |
| JP | 2000-046262 | 2/2000 |
| JP | 2003-529032 | 9/2003 |
| JP | 2005-36946 A | 2/2005 |
| JP | 2005-246967 | 9/2005 |
| JP | 2007-502940 | 2/2007 |
| JP | 2007-170658 | 7/2007 |
| JP | 2009-14115 A | 1/2009 |
| JP | 2009-522525 | 6/2009 |
| JP | 2009-523967 | 6/2009 |
| JP | 2010-509548 | 3/2010 |
| KR | 10-2006-29627 | 4/2006 |

OTHER PUBLICATIONS

English Language abstract and translation of JP 2009-14115 published on Jan. 22, 2009.
English Language abstract and translation of JP 2007-239947 published on Sep. 20, 2007.
English Language Abstract and Translation of JP 2005-036946 published on Feb. 10, 2005.
English Language abstract and translation of JP 2007-170658 published on Jul. 5, 2007.
English Language translation of JP 2009-523967 published on Jun. 25, 2009.
English Language translation of JP 2010-509548 published on Mar. 25, 2010.
English Language translation of JP 2009-522525 published on Jun. 11, 2009.
English LanguageAbstract and translation of JP 2005-246967 published on Sep. 15, 2005.
Chinese Office Action issued in CN 201380017630.3 dated Jun. 3, 2015 with Translation.
English Language Abstract and Translation for JP H11-159669 published Jun. 15, 1999.
Korean Office Action issued in KR 10-2014-7027894 dated Jun. 17, 2015, No copy submitted.
English Language Abstract and Translation JP 2000-046262 published Feb. 18, 2000.
English Language Abstract and Translation for KR 10-2006-0029627 published Apr. 6, 2006.
English Language Abstract for JP S55-106788 published Aug. 15, 1980.
European Search Report issued in EP 13826387.6 on Feb. 8, 2016.
English Language Abstract and Machine Translation of EP 2281474 published Feb. 9, 2016.
English Language Abstract and Machine Translation of DE 4304534 published Aug. 18, 1994.
Japanese Office Action (with English translation) issued in JP 2013-055031 dated Jun. 14, 2016.
Taiwanese Office Action (with partial English translation) issued in TW 102127049 dated May 23, 2016.
English Abstract of JPS56-019516 issued May 8, 1981.
English Abstract of JPH02-043073 issued Sep. 27, 1990.
English Abstract of JPS51-003917 issued Jan. 13, 1976.
English Translation of CN101821541 issued Sep. 1 2010.

* cited by examiner

FITTING, FERRULE, AND FERRULE MANUFACTURING METHOD

CROSS REFERENCE TO RELATED APPLICATIONS

This application is a U.S. National Stage Application of International Application No. PCT/JP2013/063906 filed May 20, 2013, which claims priority from Japan Patent Application No. 2012-169271 filed Jul. 31, 2012. The entirety of all the above-listed application are incorporated herein by reference.

The present invention relates to a fitting for use in connection between pipes such as fluid pipes for passing fluids therethrough.

BACKGROUND ART

For connection between fluid pipes, a double ferrule-type fitting is a fitting that provides a high sealing property with a small tightening torque (see PTL 1 and PTL 2).

FIGS. 1A to 1C are views illustrating a typical double ferrule-type fitting. Referring to FIG. 1A, a double ferrule-type fitting 90 includes a fitting body 91, a nut 92, a front ferrule 93, and a back ferrule 94.

The fitting body 91 and the nut 92 are coupled together by screw coupling. As the screw coupling is tightened, the nut 92 pushes the back ferrule 94 (point a in the figure) as shown in FIG. 1A. The back ferrule 94, pushed by the nut 92, pushes the front ferrule 93 (point b in the figure) while sliding under the front ferrule 93 as shown in FIG. 1B. As the back ferrule 94 slides under the front ferrule 93, the front ferrule 93 has its tip bite into a pipe 95 along a tapered surface of the fitting body 91 while rotating to rise so as to raise the rear end (point c in the figure).

Then, as the front ferrule 93 rises, with point b serving as the point of effort and point d as the fulcrum, as shown in FIG. 1C, a strong biting force is generated at point c as the point of load, thus realizing a good seal mechanism.

With such a double ferrule-type fitting 90, it is possible to substantially prevent a fluid leakage because of its high sealing property.

On the other hand, various single ferrule-type fittings have been proposed in order to reduce the cost by reducing the number of parts and to facilitate the installation (see PTL 3 to PTL 5). A single ferrule-type fitting is a fitting having a single ferrule, and includes a fitting body, a nut, and a ferrule. The ferrule, being pushed by the nut as the screw coupling is tightened, has its tip bite into the pipe along a tapered surface of the fitting body, thus realizing a seal mechanism. Using a single ferrule placed between the fitting body and the nut reduces the number of parts and also facilitates the installation.

These single ferrule-type fittings obtain a force for making the tip of the ferrule bite into the pipe in the radially inward direction from the force of the nut pushing the ferrule in the axial direction. The shape of the single ferrule is devised so as to convert the direction of force from the axial direction to the radially inward direction.

However, as opposed to a double ferrule-type fitting, where as the back ferrule 94 slides under the front ferrule 93, the front ferrule 93 rises, with point b serving as the point of effort and point d as the fulcrum, a single ferrule-type fitting changes the direction of force by the shape of the single ferrule, and it is therefore not possible to efficiently generate a force in the radially inward direction generally at the tip of the pipe.

PTL 6 provides various discussions on the characteristics of single ferrule-type fittings.

CITATION LIST

Patent Literature

[PTL 1]
Japanese Translation of PCT Application No. 2003-529032
[PTL 2]
Japanese Translation of PCT Application No. 2009-523967
[PTL 3]
Japanese Translation of PCT Application No. 2010-509548
(FIGS. 1A to 1D, 4A, 4B, 6A to 6C, 7, 8, 9, etc.)
[PTL 4]
Japanese Translation of PCT Application No. 2007-502940
(FIGS. 7, 7A, 8, 13, 13A, 14, etc.)
[PTL 5]
Japanese Translation of PCT Application No. 2009-522525
(FIGS. 13, 14)
[PTL 6]
Japanese Patent Application Laid-open No. 2005-246967
(Paragraphs 0011 to 0021, etc.)

SUMMARY OF INVENTION

Technical Problem

As discussed above, a double ferrule-type fitting is capable of efficiently obtaining a force for making the tip of the ferrule bite into the pipe but has a larger number of parts, whereas a single ferrule-type fitting has a smaller number of parts but is not capable of efficiently obtaining a force for making the tip of the ferrule bite into the pipe. Thus, a double ferrule-type fitting and a single ferrule-type fitting both have advantages and disadvantages.

An object of the present invention is to provide a technique with which a force for driving the tip of the ferrule to bite into the pipe can be efficiently generated with a small number of parts.

Solution to Problem

A fitting according to one embodiment of the present invention is a fitting to be connected to a pipe, the fitting including: a first member having a through hole for receiving the pipe; a second member having a through hole for receiving the pipe, the second member being coupled by screw coupling with the first member, with a central axis of the through hole being aligned with a central axis of the through hole of the first member; and a ferrule having a through hole extending from a first end portion of the ferrule to a second end portion of the ferrule for receiving the pipe, the ferrule including a portion having a greater inner diameter than the first end portion and the second end portion between the first end portion and the second end portion, and the ferrule being placed in an accommodation space formed by an inner circumferential surface of the first member, an inner circumferential surface of the second member and an outer circumferential surface of the pipe, with a central axis of the through hole being aligned with the central axes of the first member and the second member, wherein: the ferrule has a rising portion including the first end portion, a pressed portion located closer to the second end portion than the rising portion, and an intermediate portion including a portion therein where an inner diameter is greater than the first end portion and the second end portion, the intermediate portion connecting together the rising portion and the pressed portion; the first member has a first tapered inner circumferential surface, which is an inner circumferential surface having a tapered shape, to be in contact with the first end portion of the ferrule; the second member has a pressing portion for pressing at least a portion of the pressed portion of the ferrule; the accommodation space has a first clearance space for accommodating the ferrule therein and allowing the rising portion to rise so as to increase an angle of the rising portion with respect to the outer circumferential surface of the pipe; and as the screw coupling between the first member and the second member is tightened, the rising portion of the ferrule rises to rotate, with an outer circumference of the first end portion serving as a fulcrum and an inner circumference of the first end portion serving as a point of load, thereby implementing a drive to bite into an outer circumference of the pipe.

A ferrule according to one embodiment of the present invention is a ferrule for use in a fitting to be connected to a pipe, the fitting including: a first member having a through hole for receiving the pipe; and a second member having a through hole for receiving the pipe, the second member being coupled by screw coupling with the first member, with a central axis of the through hole being aligned with a central axis of the through hole of the first member, the ferrule including: a through hole penetrating from a first end portion of the ferrule to a second end portion of the ferrule for receiving the pipe, a portion having a greater inner diameter than the first end portion and the second end portion being provided between the first end portion and the second end portion; a rising portion including the first end portion; a pressed portion located closer to the second end portion than the rising portion; and an intermediate portion including a portion therein where an inner diameter is greater than the first end portion and the second end portion, the intermediate portion connecting together the rising portion and the pressed portion, wherein: the ferrule is placed in an accommodation space, with a central axis of the through hole being aligned with central axes of the first member and the second member, the accommodation space being formed by an inner circumferential surface of the first member having a first tapered inner circumferential surface, which is an inner circumferential surface having a tapered shape, to be in contact with the first end portion of the ferrule, an inner circumferential surface of the second member having a pressing portion for pressing at least a portion of the pressed portion of the ferrule, and an outer circumferential surface of the pipe, and the accommodation space having a first clearance space for accommodating the ferrule therein and allowing the rising portion to rise so as to increase an angle of the rising portion with respect to the outer circumferential surface of the pipe; and as the screw coupling between the first member and the second member is tightened, the rising portion of the ferrule rises to rotate, with an outer circumference of the first end portion serving as a fulcrum and an inner circumference of the first end portion serving as a point of load, thereby implementing a drive to bite into an outer circumference of the pipe.

A ferrule manufacturing method according to one embodiment of the present invention is a ferrule manufacturing method for manufacturing a ferrule for use in a fitting, the fitting including: a first member having a through hole for receiving the pipe; a second member having a through hole for receiving the pipe, the second member being coupled by screw coupling with the first member, with a central axis of the through hole being aligned with a central axis of the through hole of the first member; and a ferrule having a through hole extending from a first end portion of the ferrule to a second end portion of the ferrule for receiving the pipe, the ferrule including a portion having a greater inner diameter than the first end portion and the second end portion between the first end portion and the second end portion, and the ferrule being placed in an accommodation space formed by an inner circumferential surface of the first member, an inner circumferential surface of the second member and an outer circumferential surface of the pipe, with a central axis of the through hole being aligned with the central axes of the first member and the second member, wherein: the ferrule has a rising portion including the first end portion, a pressed portion located closer to the second end portion than the rising portion, and an intermediate portion including a portion therein where an inner diameter is greater than the first end portion and the second end portion, the intermediate portion connecting together the rising portion and the pressed portion; the first member has a first tapered inner circumferential surface, which is an inner circumferential surface having a tapered shape, to be in contact with the first end portion of the ferrule; the second member has a pressing portion for pressing at least a portion of the pressed portion of the ferrule; the accommodation space has a first clearance space for accommodating the ferrule therein and allowing the rising portion to rise so as to increase an angle of the rising portion with respect to the outer circumferential surface of the pipe; and as the screw coupling between the first member and the second member is tightened, the rising portion of the ferrule rises to rotate, with an outer circumference of the first end portion serving as a fulcrum and an inner circumference of the first end portion serving as a point of load, thereby implementing a drive to bite into an outer circumference of the pipe, the method including: severing a long pipe member to produce a short pipe member having a predetermined length, the short pipe member having a uniform outer diameter and a uniform inner diameter between opposite ends thereof to be the first end portion and the second end portion; and machining the short pipe member to form the rising portion, the intermediate portion and the pressed portion between the first end portion and the second end portion, which both have such an inner diameter that the pipe can be accommodated therein.

DESCRIPTION OF EMBODIMENTS

An example embodiment of the present invention will be described below with reference to the drawings.

Figure 2:
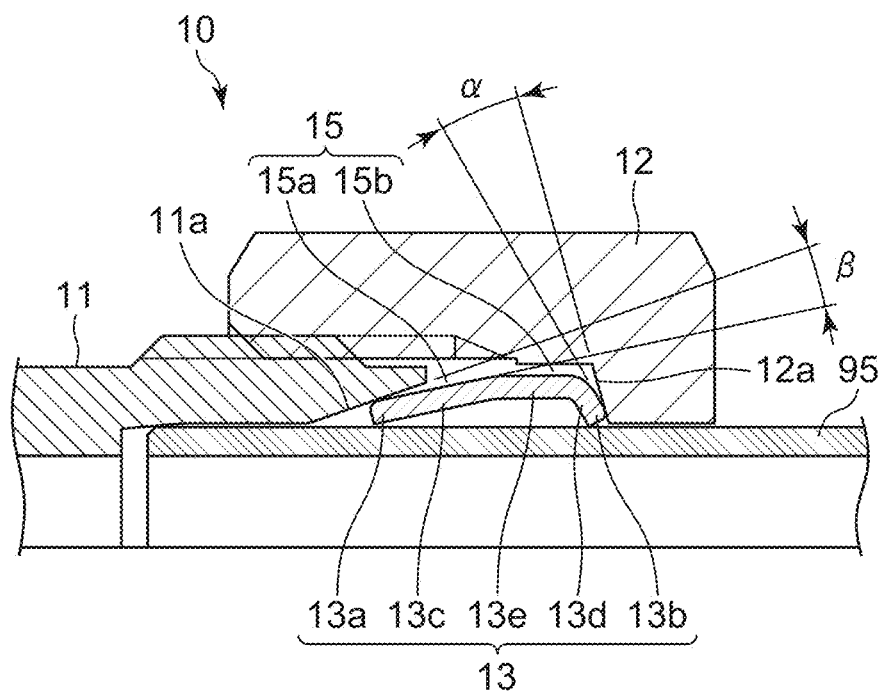
FIG. 2 is a cross-sectional view of a fitting according to the present embodiment.

FIG. 2 is a cross-sectional view of a fitting according to the present embodiment. Referring to FIG. 2, a fitting 10 includes a fitting body 11, a nut 12, and a ferrule 13. A fitting is used connected to a pipe for purposes of connecting together pipes for passing a fluid therethrough.

The fitting body 11 and the nut 12 are coupled together by screw coupling, which can be tightened and loosened. The fitting body 11, the nut 12 and the ferrule 13 have a through hole receiving the pipe 95. The fitting 10 receives the pipe 95 through the nut 12, the ferrule 13 and the fitting body 11 in this order so that the ferrule 13 is accommodated in the accommodation space formed by the inner circumferential surface of the fitting body 11, the inner circumferential surface of the nut 12 and the outer circumferential surface of the pipe 95, and is connected to the pipe 95 as the screw coupling between the fitting body 11 and the nut 12 is tightened.

The ferrule 13 includes, between a front end portion (first end portion) 13a and a rear end portion (second end portion) 13b, a rising portion 13c, an intermediate portion 13e and a pressed portion 13d. Herein, it is assumed that the front side is defined as the side of the fitting body 11, and the rear side as the side of the nut 12.

There is an area where the inner diameter is larger than the front end portion 13a and the rear end portion 13b between the front end portion 13a and the rear end portion 13b of the ferrule. The rising portion 13c is an area, including the front end portion 13a, where the inner diameter and the outer diameter increase gradually toward the rear side. The pressed portion 13d is an area, including the rear end portion 13b, where the inner diameter and the outer diameter decrease gradually toward the rear side. The intermediate portion 13e is an area between the rising portion 13c and the pressed portion 13d, and includes a portion of the largest inner diameter.

The fitting body 11 has a tapered inner circumferential surface 11a, which is an inner circumferential surface having a tapered shape, to be in contact with the front end portion 13a of the ferrule 13. The tapered inner circumferential surface 11a and the outer circumferential surface of the rising portion 13c of the ferrule 13 form a predetermined angle β along a plane that includes the central axis.

The nut 12 has a pressing portion 12a for pressing at least a portion of the pressed portion 13d of the ferrule 13.

The pressing portion 12a has a tapered inner circumferential surface, which is an inner circumferential surface having a tapered shape, to be in contact with the rear end portion 13b of the ferrule 13. The tapered inner circumferential surface and the pressed portion 13d of the ferrule 13 form a predetermined angle α along a plane that includes the central axis. Note that α and β may be set to appropriate values based on the set values of various parameters such as the thickness of the ferrule 13, the length of the intermediate portion 13e, the shape of the pressed portion 13d, and the shape of the pressing portion 12a of the nut 12.

When the fitting body 11 and the nut 12 are in a finger-tight state, the accommodation space has a clearance space 15 capable of accommodating the ferrule 13 therein, and further allowing the rising portion 13c to rise so as to increase the outer diameter of the intermediate portion 13e and increase the angle formed with respect to the outer circumferential surface of the pipe 95 (decrease the angle β). The finger-tight state is a state where the screw coupling between the fitting body 11 and the ferrule 13 has been tightened to such a degree that the fitting body 11 and the ferrule 13 are in contact with each other and the ferrule 13 and the nut 12 are in contact with each other, but there is no deformation of the ferrule 11.

Note that as an example, the present embodiment is directed to an example where the clearance space 15 has two spaces: a first clearance space 15a capable of allowing the rising portion 13c to rise so as to increase the angle formed with respect to the outer circumferential surface of the pipe 95; and a second clearance space 15b for increasing the outer diameter of the intermediate portion 13e for allowing the rising portion 13c to rise. The first clearance space 15a is a space located on the outer side (the upper side in FIG. 2) of the rising portion 13c, and the second clearance space 15b is a space located on the outer side (the upper side in FIG. 2) of the intermediate portion 13e. However, the present invention is not limited to this example. In other examples, the fitting may include the first clearance space 15a but no second clearance space 15b, and the rising portion 13c can nevertheless rise because of the provision of the first clearance space 15a.

By aligning together the central axes of the nut 12, the ferrule 13 and the fitting body 11, then receiving the pipe 95 through the nut 12, the ferrule 13 and the fitting body 11 in this order, and then tightening the screw coupling between the fitting body 11 and the nut 12 from the finger-tight state with a predetermined tightening torque by a predetermined amount of tightening, the front end portion 13a of the ferrule 13 bites into the pipe 95 to form a seal, thereby connecting the fitting 10 to the pipe 95.

According to the present embodiment, since the intermediate portion 13e of the ferrule 13 has a portion of a large inner circumference, the rising portion 13c rises while the intermediate portion 13e bulges outwardly, with the ferrule 13, being pushed by the nut 12, remaining abutted against the fitting body 11. When the rising portion 13c of the ferrule 13 rises, the outer circumference of the front end portion 13a contacts the tapered inner circumferential surface 11a of the fitting body 11 so that the movement thereof is restricted. Therefore, a force for driving the inner circumferential portion of the front end portion 13a in contact with the pipe 95 to bite into the pipe 95 is efficiently generated, and the fitting 10 is connected to the pipe 95 in such a state that a sealing property can be obtained.

Figure 3:
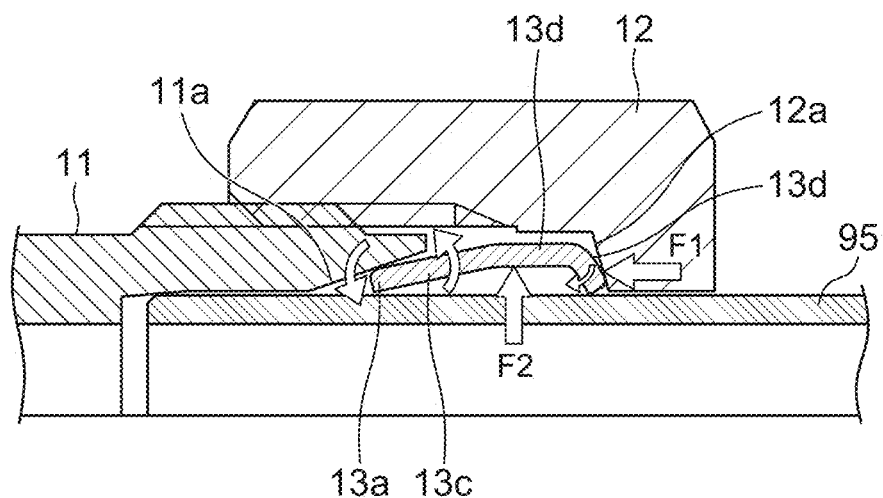
FIG. 3 is a view illustrating the motion and function of various parts when the fitting is mounted on a pipe.

Now, the action and function of various parts when the fitting 10 is mounted on the pipe 95 will be further described. FIG. 3 is a view illustrating the motion and function of various parts when the fitting is mounted on a pipe.

Referring to FIG. 3, as the screw coupling between the fitting body 11 and the nut 12 is tightened, the pressing portion 12a of the nut 12 presses forward the pressed portion 13d of the ferrule 13 by the force F1 generated in the axial direction. The ferrule 13, with its pressed portion 13d pressed, accordingly pushes forward the fitting body 11 in front of the ferrule 13. Then, as its reaction, the fitting body 11 pushes rearward the ferrule 13.

The ferrule 13, with its front end portion 13a pushed rearward and its rear end portion 13b pushed forward, deforms so that the front end portion 13a and the rear end portion 13b come closer to each other with the inner diameter and the outer diameter of the intermediate portion 13e increasing due to the force F2 deriving from the force F1. Then, the rising portion 13c rises so as to increase the angle formed with respect to the outer circumference of the pipe 95 until the angle of the outer circumferential surface thereof coincides with the angle of the tapered inner circumferential surface 11a of the fitting body 11.

As the rising portion 13c rises, the front end portion 13a is driven so that the outer circumferential portion thereof in contact with the tapered inner circumferential surface 11a of the fitting body 11 is restricted by the tapered inner circumferential surface 11a, and the inner circumferential portion thereof in contact with the pipe 95 bites into the pipe. That is, the ferrule 13 is driven to bite into the pipe 95 with a strong force based on the principle of leverage, with the outer circumferential portion of the front end portion 13a of the ferrule 13 serving as the fulcrum and the inner circumferential portion thereof as the point of load.

Since the deformed ferrule 13 remains to have some elastic force urging it to return to the original shape, the ferrule 13 and the fitting body 11 push each other while the ferrule 13 and the nut 12 push each other. As a result, it is possible to suppress the loosening of the fitting 10 off the pipe 95 due to vibrations, etc. Since the elastic deformation of the ferrule 13 is such that the elastic force is lost when it returns to the finger-tight state, the nut 12 and the ferrule 13 are prevented from jumping out due to an elastic force when the fitting 10 is removed.

Figure 4:
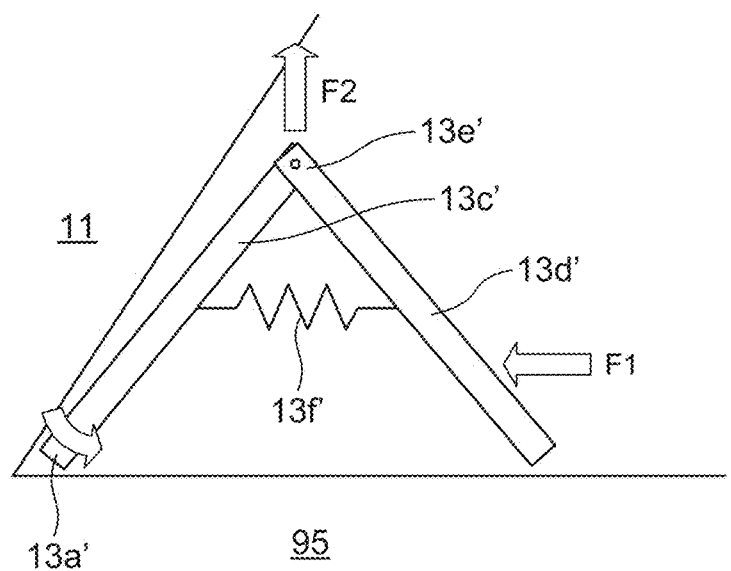
FIG. 4 is a view illustrating the principle by which the ferrule is driven to bite into the pipe.
Figure 5:
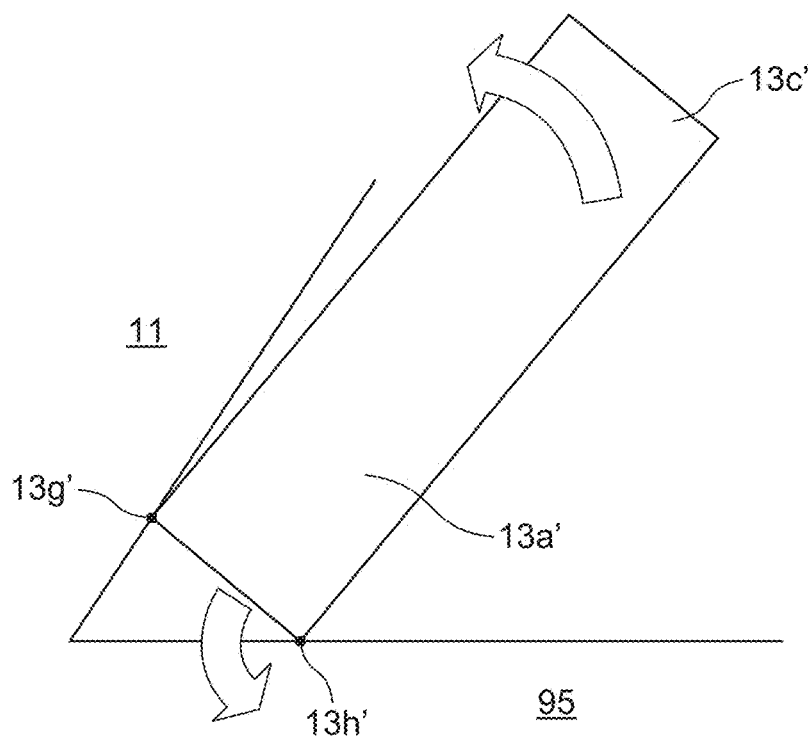
FIG. 5 is a view illustrating the principle by which the ferrule is driven to bite into the pipe.

Now, the principle by which the ferrule 13 is driven to bite into the pipe 95 in the present embodiment will be described. FIGS. 4 and 5 are views illustrating the principle by which the ferrule is driven to bite into the pipe.

As shown in FIG. 4, the ferrule 13 of the present embodiment, as seen along a cross section that passes through the central axis, can be considered as a structure in which a member 13c' modeling the rising portion 13c and a member 13d' modeling the pressed portion 13d are connected together at a connection point 13e' at one end thereof in the longitudinal direction, and in which the member 13c' and the member 13d' are further connected together at the midpoint thereof by an elastic body 13f'. In the absence of an external force on this structure, the member 13c' and the member 13d' remain at a predetermined angle due to the elastic force of the elastic body 13f'.

As the movement of a tip 13a' of the member 13c' toward the left side is restricted by the fitting body 11, and the force F1 is applied in the leftward direction in the figure on the member 13d', the force F2 is derived which shrinks the elastic body 13f' and pushes the connection point 13e' upward. As a result, a rotational motion occurs at the tip 13a' of the member 13c'.

Referring to an enlarged view in the vicinity of a tip 13h' shown in FIG. 5, with the entire member 13c' pressed against the pipe 95 and the fitting body 11, a rotational motion occurs at the tip 13a' of the member 13c', thereby rotating the point of load 13h' about the fulcrum 13g' as the center, and driving the point of load 13h' so as to bite into the pipe 95.

Figure 1A:
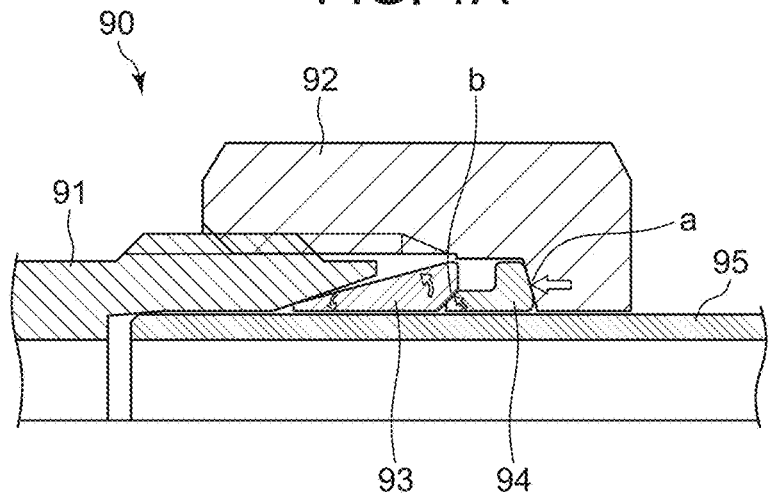
FIG. 1A is a view illustrating a typical double ferrule-type fitting.
Figure 1B:
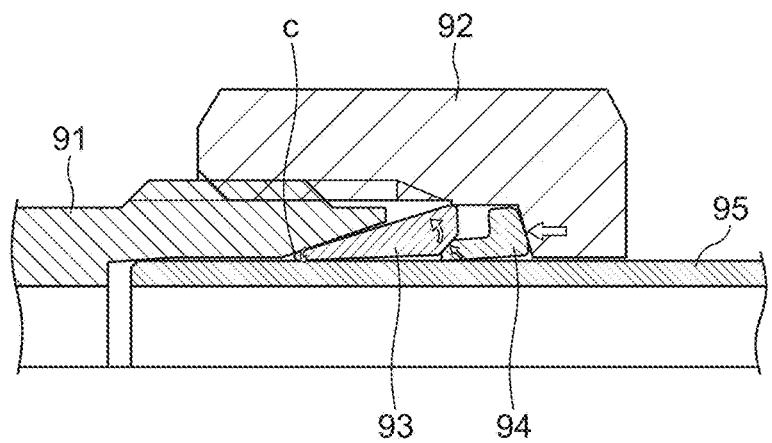
FIG. 1B is a view illustrating, along with FIG. 1A, a typical double ferrule-type fitting.
Figure 1C:
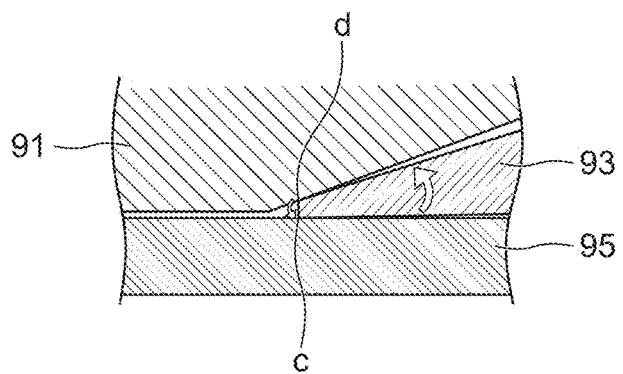
FIG. 1C is a view illustrating, along with FIGS. 1A and 1B, a typical double ferrule-type fitting.
Figure 6:
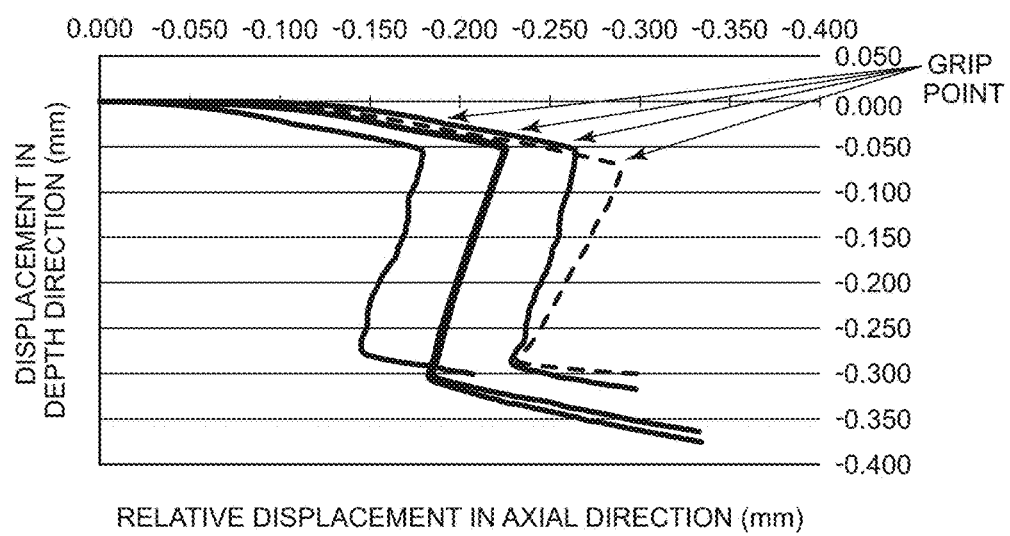
FIG. 6 is a graph obtained by measuring changes in the relative position of the front end portion of the ferrule with respect to the pipe when the front end portion of the ferrule is driven to bite into the outer circumference of the pipe.

FIG. 6 is a graph obtained by measuring changes in the relative position of the front end portion of the ferrule with respect to the pipe when the front end portion of the ferrule is driven to bite into the outer circumference of the pipe. A plurality of graphs indicated by solid lines in FIG. 6 represent a plurality of measurements obtained by measuring, with different parameter values, changes in the position of the front end portion 13a when the front end portion 13a of the ferrule 13 is driven to bite into the outer circumference the pipe 95. What is indicated by a broken line in FIG. 6 represents a reference example showing changes in the position of the front end portion of the front ferrule 93 in the double ferrule-type fitting 90 shown in FIGS. 1A to 1C.

In FIG. 6, the horizontal axis represents the relative position in the axial direction, and the vertical axis represents the relative displacement in the depth direction. For the horizontal axis and the vertical axis, the relative position in the finger-tight state is used as the origin. In the axial direction, the value increases in the negative direction as it moves forward. On the vertical axis, the value increases in the negative direction as the bite increases.

As can be seen from FIG. 6, when the screw coupling is tightened with a predetermined torque from the finger-tight state, the front end portion 13a of the ferrule 13 primarily moves in the axial direction with respect to the pipe 95 in the initial stage. Past a certain point, however, the inner circumference of the front end portion 13a of the ferrule 13 engages with the outer circumference of the pipe 95, thereby transitioning to another stage where the front end portion 13a primarily moves in the biting direction based on the principle of leverage occurring due to the rise of the rising portion 13c. This point of transition is the grip point in the figure. In the stage where the front end portion 13a moves primarily in the biting direction, the front end portion 13a rather moves backwards as seen in the axial direction. Upon completion of the rise of the rising portion 13c, the front end portion 13a transitions into a stage where the front end portion 13a again moves primarily forward. Thus, when the rising portion 13c rises, the principle of leverage acts, with the outer circumference of the front end portion 13a serving as the fulcrum and the inner circumference of the front end portion 13a as the point of load, so that in at least a portion of the stage when the screw coupling is tightened, a phenomenon occurs where the inner circumference of the front end portion 13a bites into the outer circumference of the pipe 95 while moving back in the opposite axial direction to the force by which the nut 12 pushes the ferrule 13 in the axial direction.

As the front end portion 13a of the ferrule 13 is driven to bite as described above, the ferrule 13 bites into the pipe 95 with a strong force, thereby providing a sealing property. As the front end portion 13a of the ferrule 13 is driven to bite while once moving back in the opposite direction, the ferrule and the pipe 95 are desirably sealed together, thereby providing a strong sealing property. As can be seen from FIG. 6, with the single ferrule-type fittings (the present embodiment) indicated by solid lines, the front end portion 13a of the ferrule 13 bites into the pipe 95 to a depth comparable to that for the double ferrule-type fitting indicated by a broken line.

Note that in the present embodiment, when the screw coupling between the fitting body 11 and the nut 12 is in the finger-tight state, the outer circumferential surface of the rising portion 13c of the ferrule 13 forms a predetermined angle β with respect to the tapered inner circumferential surface 11a of the fitting body 11 along a cross section that includes the central axis, as shown in FIG. 2. Thus, in the present embodiment, by allowing the rising portion 13c to rise by the appropriate angle β, there is obtained a drive with an appropriate amount of bite, thus obtaining a desirable seal between the front end portion 13a of the ferrule 13 and the pipe 95.

In the present embodiment, the pressing portion 12a of the nut 12 has a tapered inner circumferential surface, which is an inner circumferential surface having a tapered shape, to be in contact with the rear end portion 13b of the ferrule 13, as shown in FIG. 2. Then, the outer circumferential surface of the pressed portion 13d of the ferrule 13 forms a predetermined angle α with respect to the tapered inner circumferential surface of the nut 12 along a cross section that includes the central axis. In the present embodiment, when the pressed portion 13d is pressed by the pressing portion 12a, the pressed portion 13d rises so as to conform to the tapered inner circumferential surface of the pressing portion 12a as the intermediate portion 13e expands outwardly. In this process, the rear end portion 13b of the ferrule 13 is driven so as to tighten the pipe 95. Then, in the present embodiment, by allowing the pressed portion 13d to rise by an appropriate angle β, there is obtained a drive with an appropriate amount of tightening, thereby allowing the rear end portion 13b of the ferrule 13 to desirably hold the pipe 95.

In the present embodiment, the ceiling surface of the accommodation space formed by the inner circumferential surface of the fitting body 11, the inner circumferential surface of the nut 12 and the outer circumferential surface of the pipe 95 may come into contact with the intermediate portion 13e whose outer diameter has been increased with the rising portion 13c of the ferrule 13 having risen by the angle β. This can be realized by designing in advance so that the interval between the apex present along the intermediate portion 13e of the ferrule 13 and the ceiling surface of the accommodation space is equal to a predetermined distance in the finger-tight state. Then, as the rising portion 13c rises by an appropriate angle β to achieve a state where a desirable seal is obtained between the ferrule 13 and the pipe 95, the apex of the ferrule 13 is in contact with the ceiling surface of the accommodation space, thereby reinforcing the ferrule 13, making it possible to maintain a desirable sealing property. Note that the ceiling surface of the accommodation space may be formed by either the fitting body 11 or the nut 12. In the present invention, it is not necessary that the apex of the ferrule 13 is in contact with the ceiling surface of the accommodation space, and the apex of the ferrule 13 may be not in contact with the ceiling surface of the accommodation space.

With the ferrule 13 of the present embodiment, there is no particular limitation on the thicknesses of the front end portion 13a, the rear end portion 13b, the rising portion 13c, the pressed portion 13d and the intermediate portion 13e. There is also no particular limitation on the lengths of the rising portion 13c, the intermediate portion 13e and the pressed portion 13d.

Note however that it is preferred that the thickness of the front end portion 13a of the ferrule 13 is less than the length of the rising portion 13c. If the length of the rising portion 13c of the ferrule 13 is greater than the thickness of the front end portion 13a thereof, as the rising portion 13c rises, the movement of the front end portion 13a is restricted with the outer circumference thereof being in contact with the tapered inner circumferential surface 11a, and as the inner circumferential portion in contact with the pipe 95 is driven to bite into the pipe 95, the inner circumference is driven to bite into the pipe 95 with a strong force based on the principle of leverage, with the outer circumference of the front end portion 13a serving as the fulcrum, and the inner circumference thereof as the point of load.

Conversely, the thickness of the front end portion 13a of the ferrule 13 may be greater than the length of the rising portion 13c. In this case, only by slightly increasing the outer diameter of the intermediate portion 13e, the front end portion 13a of the ferrule 13 can be driven to bite with an amount of bite greater than that.

In the present embodiment, the outer circumference of the front end portion 13a of the ferrule 13 may be R-chamfered as shown in FIGS. 2 and 3. Since the outer circumference of the front end portion 13a is R-chamfered, when the rising portion 13c rises, the outer circumference of the front end portion 13a pressed against the fitting body 11 slides against the tapered inner circumferential surface 11a of the fitting body 11, and the inner circumference of the front end portion 13a is unlikely to slip on the pipe 95 so that it can be desirably driven to bite.

An example of a method for manufacturing the ferrule 13 of the fitting 10 according to the present embodiment will now be described.

Figure 7:
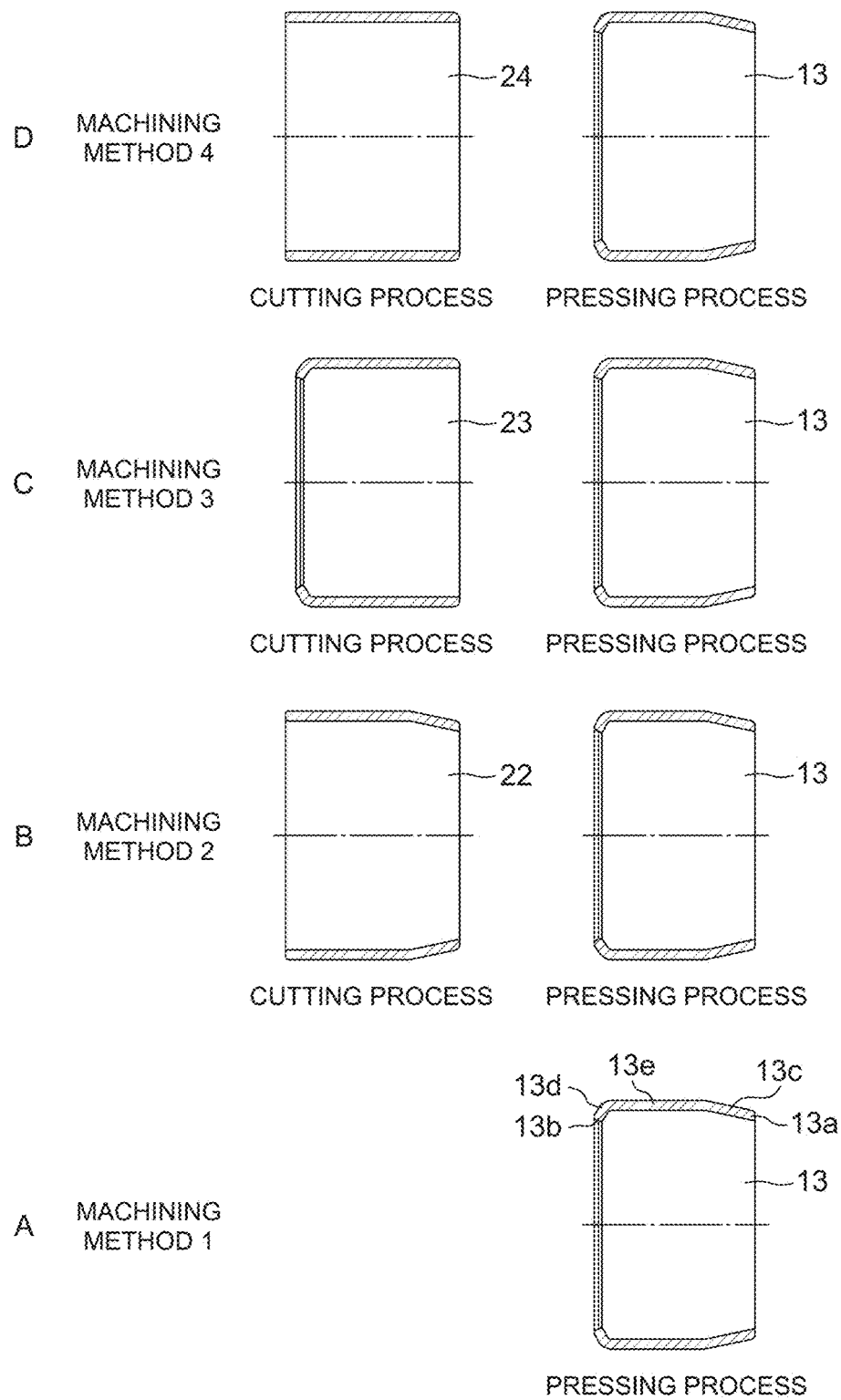
FIG. 7 is a view illustrating various machining methods for manufacturing a ferrule.

FIG. 7 is a view illustrating various machining methods for manufacturing a ferrule. FIG. 7 illustrates Machining Methods 1 to 4, including a cutting process.

In Machining Method 1, the ferrule 13 is produced only by a cutting process. The ferrule 13 of a desired shape and size is produced from a workpiece of a predetermined material by a cutting process. Since the slope of the rising portion 13c including the front end portion 13a on the right side of the figure and the slope of the pressed portion 13d including the rear end portion 13b on the left side of the figure are both formed by a cutting process, the cutting of the inner circumferential surface of the intermediate portion 13e will be of a slightly high degree of difficulty.

In Machining Method 2, the ferrule 13 is produced by a cutting process and a pressing process.

First, a cutting process is performed to produce an intermediate member 22. The slope of the rising portion 13c on the front side (the right side in the figure) is formed by a cutting process. The slope of the pressed portion 13d in the rear end portion 13b is not formed by a cutting process, and the inner diameter and the outer diameter are set to be constant from the intermediate portion 13e to the rear end portion 13b.

Next, a pressing process is performed. The slope of the pressed portion 13d is formed by narrowing the vicinity of the rear end portion 13b through a pressing process using a die of a predetermined shape.

In Machining Method 2, since the rear end portion 13b of the intermediate member 22 produced at the cutting process stage has the same inner diameter as the intermediate portion 13e, the degree of difficulty of the cutting process is lower than Machining Method 1.

Machining Method 3 also produces the ferrule 13 by a cutting process and a pressing process.

First, a cutting process is performed to produce an intermediate member 23. The slope of the pressed portion 13d on the rear side is formed by a cutting process. The slope of the rising portion 13c in the front end portion 13a is not formed by a cutting process, and the inner diameter is set to be constant from the intermediate portion 13e to the front end portion 13a. The outer diameter is also generally constant from the intermediate portion 13e to the front end portion 13a, but the outer circumference of the front end portion 13a is R-chamfered.

Next, a pressing process is performed. The slope of the rising portion 13c is formed by narrowing the vicinity of the front end portion 13a through a pressing process using a die of a predetermined shape.

In Machining Method 3, since the front end portion 13a of the intermediate member 23 produced at the cutting process stage has the same inner diameter as the intermediate portion 13e, the degree of difficulty of the cutting process is lower than Machining Method 1.

Machining Method 4 also produces the ferrule 13 by a cutting process and a pressing process.

First, a cutting process is performed to produce an intermediate member 24. The slope of the pressed portion 13d and the slope of the rising portion 13c are not formed by a cutting process. The inner diameter is set to be constant from the front end portion 13a to the rear end portion 13b via the intermediate portion 13e. The outer diameter is also generally constant from the front end portion 13a to the rear end portion 13b, but the outer circumference of the front end portion 13a is R-chamfered.

Next, a pressing process is performed. The slope of the rising portion 13c and the slope of the pressed portion 13d are formed by narrowing the vicinity of the front end portion 13a and narrowing the vicinity of the rear end portion 13b through a pressing process using a die of a predetermined shape.

In Machining Method 4, since the intermediate member 24 produced at the cutting process stage has the same inner diameter from the front end portion 13a to the rear end portion 13b, the degree of difficulty of the cutting process is lower than Machining Method 1. In this example, since the intermediate member 24 has a uniform inner diameter and a uniform outer diameter from the front end portion 13a to the rear end portion 13b, the a cutting process step can be shortened by severing a commercially-available pipe material (long pipe member) and using it in the cutting process.

Figure 8:
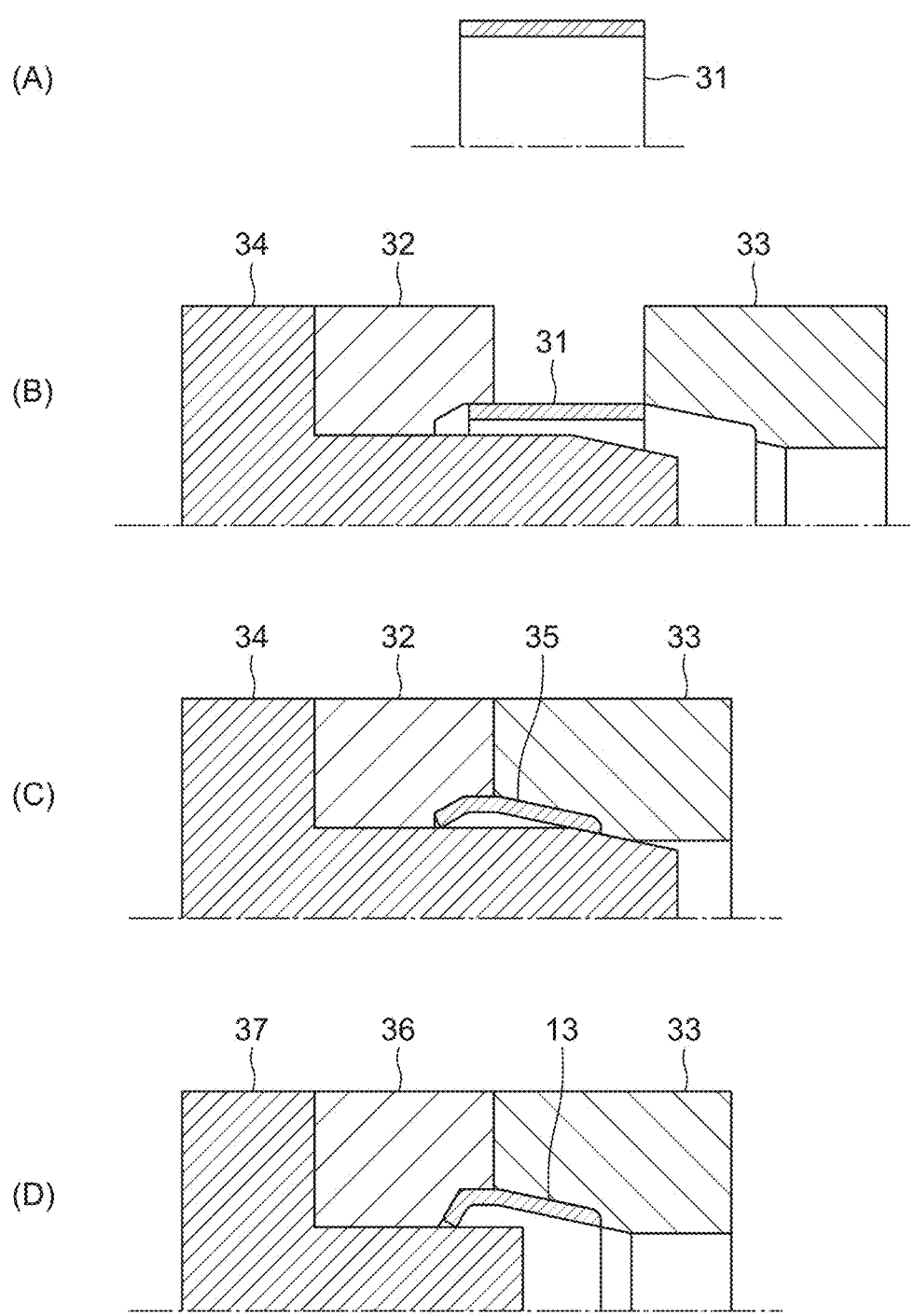
FIG. 8 is a view illustrating another machining method for manufacturing a ferrule.

FIG. 8 is a view illustrating another machining method for manufacturing a ferrule. FIG. 8 illustrates a machining method using a pressing process.

FIG. 8A shows a workpiece 31 for use in the pressing process. As an example, the workpiece 31 is obtained by severing a commercially-available pipe material into a predetermined length.

FIG. 8B shows a state where the workpiece 31 has been set in a die system including dies 32 to 34. The die 33 has a portion where the inner circumferential surface thereof is narrowed into a tapered shape inward (rightward in the figure) from the insertion opening, through which the workpiece 31 is inserted. The die 32 also has a portion where the inner circumferential surface thereof is narrowed into a tapered shape inward (leftward in the figure) from the insertion opening, through which the workpiece 31 is inserted. The die 34, which is inserted through the through hole of the workpiece 31, has a tapered portion, where the outer diameter gradually decreases, on the front side (on the right side in the figure) of the cylindrical portion of a uniform outer diameter.

As shown in FIG. 8C, a pressing process is performed so as to sandwich the workpiece 31 from the front side and the rear side by the die 33 and the die 32 with the die 34 inserted through the inner circumference of the workpiece 31, thereby producing an intermediate member 35. The rising portion 13c of the ferrule 13 is formed by the portion of the die 33 where the inner circumferential surface has a tapered shape and the tapered portion of the die 34. The prototype portion of the pressed portion 13d of the ferrule 13 is formed by the portion of the die 32 where the inner circumferential surface has a tapered shape and the cylindrical portion of the die 34 having a uniform outer diameter. Note however that at this stage, the prototype portion of the rear end portion 13b has a greater inner diameter than the inner diameter of the final rear end portion 13b.

Then, as shown in FIG. 8D, a pressing process is performed by a die system in which the dies 32 and 34 of FIG. 8C are replaced by dies 36 and 37. The die 37 inserted through the through hole of the intermediate member 35 has a portion to be inserted that is a cylinder whose outer diameter coincides with the inner diameter of the final rear end portion 13b. The insertion opening of the die 36, through which the intermediate member 35 is inserted, coincides with the outer diameter of the intermediate portion 13e of the final ferrule 13, and has a portion whose inner circumferential surface is narrowed in a tapered shape toward the inward direction.

The cylindrical portion of the die 37 is inserted through the opening to be the rear end portion 13b of the ferrule 13, and the shape of the outer circumferential surface of the ferrule 13 is pressed by the portion of the die 36 where the inner circumferential surface is narrowed in a tapered shape, thereby forming the pressed portion 13d of the ferrule 13.

According to the machining method of FIGS. 8A to 8D, a pipe material is severed in the initial step to produce a workpiece (short pipe member) 31 of a predetermined length, and the workpiece 31 is machined in the subsequent step, thereby producing the ferrule 13. Therefore, it is possible to manufacture the ferrule 13 at low cost only by a pressing process using a pipe material that is commercially available.

With this machining method, the front end portion 13a of the ferrule 13 for providing the seal mechanism is formed by pressing the shape with the two dies 33 and 34 in the step of FIG. 8C, and the opening is narrowed in the step of FIG. 8D by pressing, using the two dies 36 and 37, the shape of the outer circumferential surface and the inner circumferential surface of the rear end portion 13b for providing the holding mechanism, thereby making it possible to form the seal mechanism with a higher precision than the holding mechanism.

The ferrule 13 of the present embodiment can also be produced by using bulge forming.

For example, rubber bulge forming may be used instead of the pressing process of FIG. 7D. By pressurizing and deforming a rubber, and inserting the rubber inside the short pipe member 31, it is possible to form a portion having a greater inner diameter than the opposite end portions of the ferrule 13.

In the present embodiment, there is no particular limitation on the material of the fitting 10 and the pipe 95. For example, a SUS316 stainless steel may be used for the fitting body 11, the nut 12 and the ferrule 13 of the fitting 10, and the pipe 95. The ferrule 13 may be of a slightly higher strength than the pipe 95. For example, a commercially-available SUS316 may be used as the pipe 95, and a material obtained by subjecting a SUS316 to a force drawing process to increase the strength may be used as the ferrule 13. Then, the ferrule 13 can be made to desirably bite into the pipe 95.

The above embodiments of the present invention are illustrative of the present invention, and are not intended to limit the scope of the present invention thereto. A person of ordinary skill in the art can carry out the present invention in various other embodiments without departing from the gist of the present invention.

Figure 9:
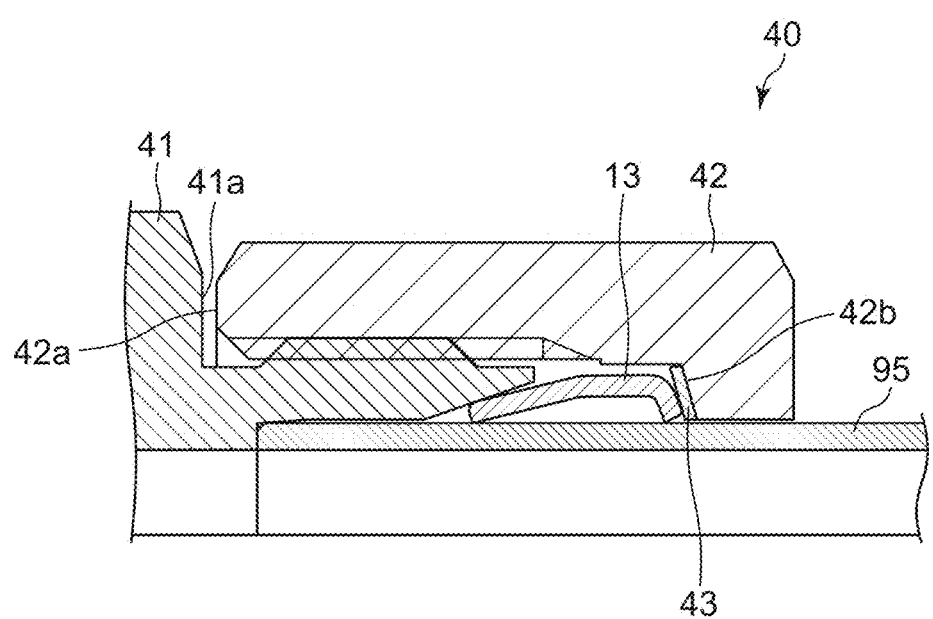
FIG. 9 is a view illustrating a variation of the fitting according to the present embodiment.

FIG. 9 is a view illustrating a variation of the fitting according to the present embodiment.

Referring to FIG. 9, a fitting 40 of the variation includes a fitting body 41, a nut 42, and the ferrule 13.

The fitting body 41 and the nut 42 are components corresponding to the fitting body 11 and the nut 12, respectively, of FIG. 2, and are basically the same as the fitting body 11 and the nut 12 except for what is discussed below.

The fitting body 41 and the nut 42 have a contact portion 41a and a contact portion 42a, respectively, which come into contact with each other to restrict the movement of each other when the screw coupling between the fitting body 41 and the nut 42 is tightened by a predetermined amount of tightening from the finger-tight state. The predetermined amount of tightening herein is an amount of tightening such that the ferrule 13 desirably bites into the pipe 95, realizing a desirable seal mechanism and a desirable holding mechanism.

In this variation, when the screw coupling is tightened by the predetermined amount of tightening, the fitting body 41 and the nut 42 come into contact with each other so that the screw coupling can no longer be tightened, thus suppressing over-tightening without having to tighten while checking the amount of tightening by means of a mark, etc.

Note that once the fitting 40 is tightened, deformation of the pipe 95, etc., occur, thereby requiring a greater amount of tightening when reusing the fitting 40 than in initial use. In this variation, a spacer 43 having a predetermined thickness is sandwiched between the pressed portion 13d of the ferrule and a pressing portion 42b of the nut 42 in the accommodation space so as to allow for additional tightening by a desired amount of tightening when reusing the fitting 40. The thickness of the spacer 43 is such a thickness that enables desired additional tightening. Thus, by using the spacer 43 when reusing the fitting 40, it is possible to easily enable a predetermined amount of additional tightening.

Although one spacer 43 of a predetermined thickness is used in the example illustrated herein, the present invention is not limited to this. A plurality of spacers 43 may be used, and spacers 43 of different thicknesses may be used. For example, for the second reuse (the third use) and thereafter, two or more spacers 43 may be sandwiched between the pressed portion 13d of the ferrule 13 and the pressing portion 42b of the nut so as to enable a further additional tightening. Alternatively, for the second reuse (the third use) and thereafter, a spacer 43 having a greater thickness than the spacer 43 used for the first reuse (the second use) may be sandwiched between the pressed portion 13d of the ferrule 13 and the pressing portion 42b of the nut 42 so as to enable a further additional tightening.

While this variation is an example that uses spacers 43 to be added during a reuse, the present invention is not limited to this. Another example may use a spacer that is used during the first use and not used during a reuse. For example, a spacer of a predetermined thickness may be placed between the contact portion 41a of the fitting body 41 and the contact portion 42a of the nut 42 of FIG. 9. Then, by removing the spacer when reusing the fitting 40, it is possible to easily enable a predetermined amount of additional tightening.

Figure 10:
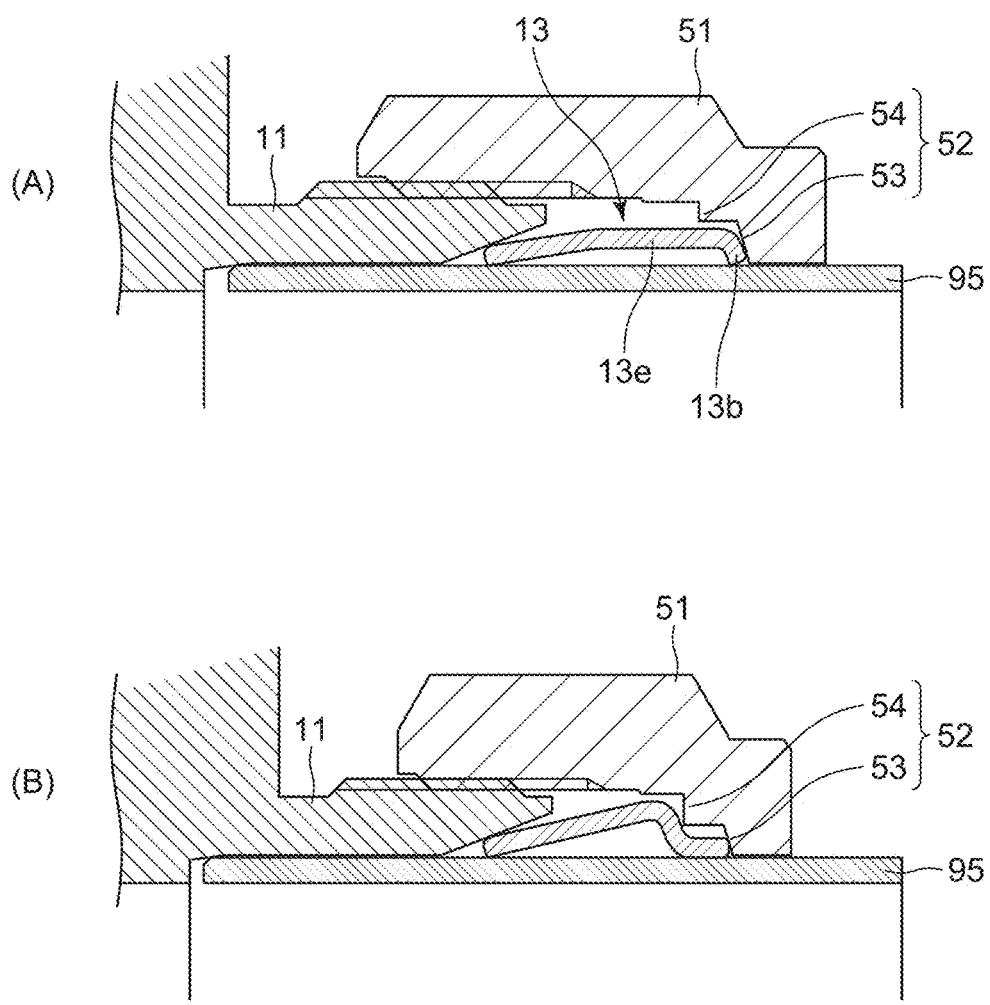
FIG. 10 is a view illustrating a fitting according to another variation.

FIG. 10 is a view illustrating a fitting according to another variation.

Referring to FIG. 10, a fitting 50 of this variation includes the fitting body 11, a nut 51, and the ferrule 13.

The nut 51 is a component corresponding to the nut 12 of FIG. 2, and is basically the same as the nut 12 except for what is discussed below.

A pressing portion 52 of the nut 12 for pressing the ferrule 13 includes a depressed portion 53 and a protruding portion 54. The protruding portion 54 is present on the outer side of the depressed portion 53 with respect to the central axis, and the protruding portion 54 is located on the front side of the depressed portion 53 in the axial direction.

As shown in FIG. 10A, in the finger-tight state, the depressed portion 53 is in contact with the rear end portion 13b of the ferrule 13. As the screw coupling between the fitting body 11 and the nut 51 is tightened from this state, the depressed portion 53 presses the rear end portion 13b of the ferrule 13, and the overall inner diameter and outer diameter of the intermediate portion 13e of the ferrule 13 start to increase. However, the rear side of the intermediate portion 13e is in contact with the protruding portion 54 above, and the increase in the outer diameter of the rear side of the intermediate portion 13e is thereafter restricted by the protruding portion 54 present on the outer side.

Therefore, the overall outer diameter of the intermediate portion 13e cannot be increased, and the diameter-increasing force F2 deriving from the force F1 from the pressing portion 52 is localized in a portion of the intermediate portion 13e that is on the front side of the protruding portion 54. As a result, as shown in FIG. 10B, the outer diameter of the portion of the intermediate portion 13e that is on the front side of the protruding portion 54 increases significantly, thereby efficiently causing a rotational motion in the front end portion 13a of the ferrule 13, and driving the inner circumference of the front end portion 13a to bite into the pipe 95.

Figure 11:
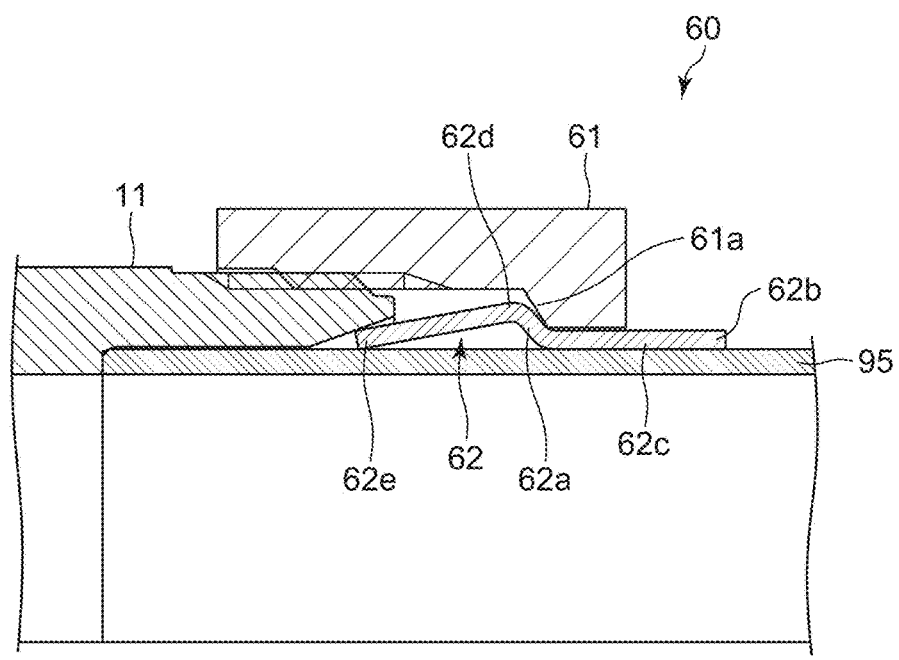
FIG. 11 is a view illustrating a fitting according to still another variation.

FIG. 11 is a view illustrating a fitting according to still another variation.

Referring to FIG. 11, a fitting 60 includes the fitting body 11, a nut 61, and a ferrule 62. Although the ferrule 13 of the embodiment of FIGS. 2 and 3, etc., is such that the pressed portion 13d includes the rear end portion 13b, the present invention is not limited to this.

In this variation, as shown in FIG. 11, a pressed portion 62a of the ferrule 62 does not include a rear end portion 62b, and is located on the front side of the rear end portion 62b. Formed between the pressed portion 62a and the rear end portion 62b is a pipe-shaped portion 62c of which the outer diameter and the inner diameter are equal to those of the rear end portion 62b.

In the nut 61 of this variation, the smallest inner diameter of a pressing portion 61a is greater than the outer diameter of the pipe 95 by such an amount that the pipe-shaped portion 62c of the ferrule 62 passes therethrough.

Also in this variation, as the screw coupling between the fitting body 11 and the nut 61 is tightened, the pressing portion 61a of the nut 61 presses the pressed portion 62a of the ferrule 62, of which the rear end portion 62b projects on the rear side of the nut 61. The inner diameter and the outer diameter of an intermediate portion 62d of the ferrule 62, of which the pressed portion 62a is pressed, increase, thereby causing a rotational motion in a front end portion 62e, and driving the inner circumference of the front end portion 62e to bite into the pipe 95.

Figure 12:
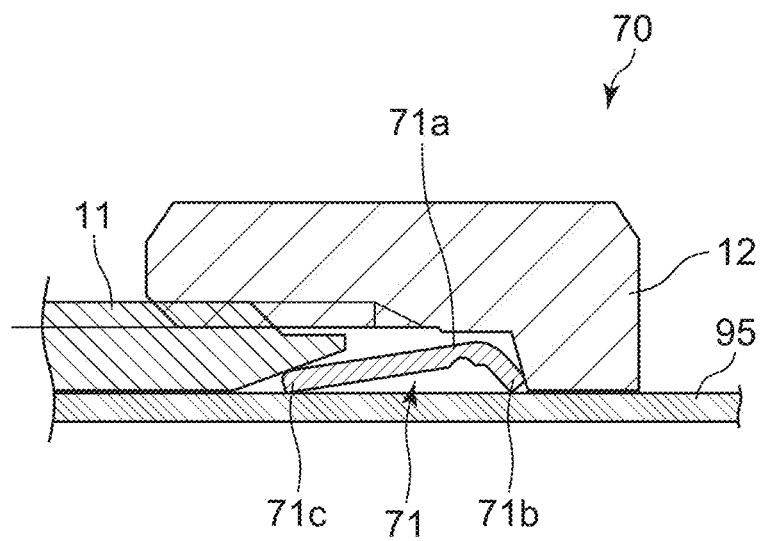
FIG. 12 is a view illustrating a fitting according to still another variation.

FIG. 12 is a view illustrating a fitting according to still another variation.

Referring to FIG. 12, a fitting 70 of this variation includes the fitting body 11, the nut 12, and a ferrule 71. The ferrule 71 is a component corresponding to the ferrule 13 of FIG. 2, and is basically the same as the ferrule 13 except for what is discussed below.

The ferrule 71 of this variation includes an intermediate portion 71a that includes a portion that is radially non-uniformly shaped at a particular position along the axial direction (a non-uniformly-shaped portion 71b). In the example of FIG. 12, the non-uniformly-shaped portion 71b included in the intermediate portion 71a has a smaller thickness than other portions of the intermediate portion 71a.

The non-uniformly-shaped portion 71b is realized by a groove that is cut continuously over the entire circumference on the inner circumferential surface at a particular position of the ferrule 71 in the axial direction. With the provision of the non-uniformly-shaped portion 71b, the ferrule 71 of this variation can be more easily deformed so as to increase the inner diameter and the outer diameter of the intermediate portion a, as compared with the ferrule 13 shown in FIGS. 2 and 3. Therefore, the tightening torque for causing a rotational motion in a front end portion 71c can be suppressed to be small.

Figure 13:
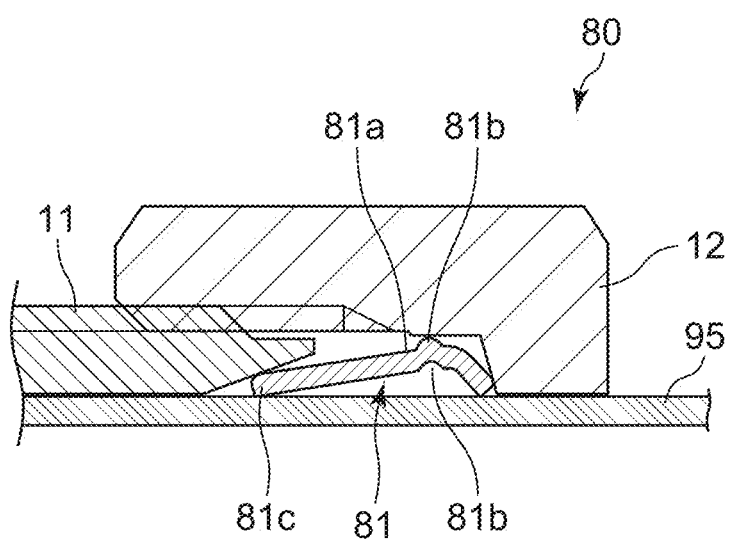
FIG. 13 is a view illustrating a fitting according to still another variation.

FIG. 13 is a view illustrating a fitting according to still another variation.

Referring to FIG. 13, a fitting 80 of this variation includes the fitting body 11, the nut 12, and a ferrule 81. The ferrule 81 is a component corresponding to the ferrule 13 of FIG. 2, and is basically the same as the ferrule 13 except for what is discussed below.

The ferrule 81 of this variation also includes a non-uniformly-shaped portion 81b at a particular position of an intermediate portion 81a in the axial direction. In the example of FIG. 13, the non-uniformly-shaped portion 81b includes a portion where the inner diameter of the inner circumferential surface is different from that of other portions and a portion where the outer diameter of the outer circumferential surface is different from that of other portions. Specifically, as seen in a cross section that includes the central axis, the inner circumferential surface has a depressed portion, and the outer circumferential surface has a projecting portion. They are the non-uniformly-shaped portion 81b, which is formed by a punching process the particular position of the ferrule 81 in the axial direction from the inner circumferential surface thereof.

With the provision of the non-uniformly-shaped portion 81b, the ferrule 81 of this variation can be more easily deformed so as to increase the inner diameter and the outer diameter of the intermediate portion a, as compared with the ferrule 13 shown in FIGS. 2 and 3. Therefore, the tightening torque for causing a rotational motion in a front end portion 81c can be suppressed to be small.

Note that although this variation is directed to an example where the ferrule 81 is punched from the inner circumferential surface thereof, the present invention is not limited to this, and the non-uniformly-shaped portion may be formed by punching from the outer circumferential surface.

Although the non-uniformly-shaped portion 81b is formed by a punching process in the example illustrated herein, the present invention is not limited to this. As another example, the non-uniformly-shaped portion 81b may be formed by a cutting process.

The non-uniformly-shaped portion 81b extending over the entire circumference of the ferrule 81 of this variation does not need to be formed by a single iteration of a punching process, but may be formed by a plurality of separate iterations of a punching process.

Figure 14A:
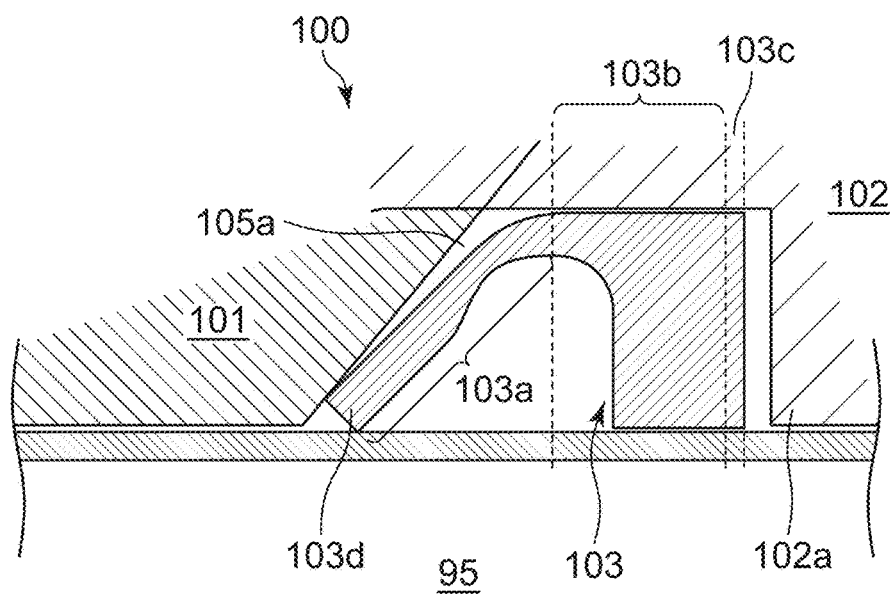
FIG. 14A is a view illustrating a fitting according to still another variation.
Figure 14B:
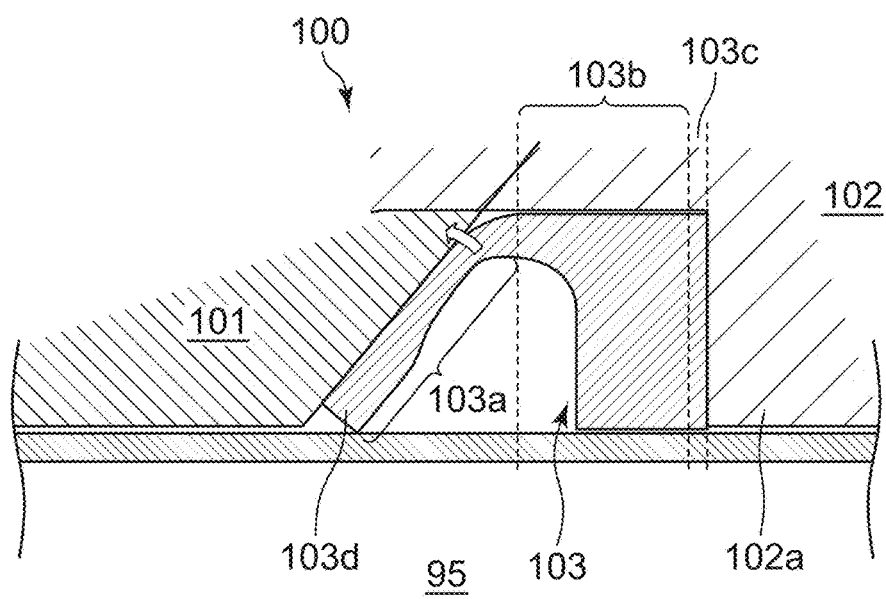
FIG. 14B is a view illustrating, along with FIG. 14A, a fitting according to a variation.

FIGS. 14A and 14B are views illustrating a fitting according to still another variation.

Referring to FIG. 14A, a fitting 100 includes a fitting body 101, a nut 102, and a ferrule 103. The ferrule 103 includes a rising portion 103a, an intermediate portion 103b, and a pressed portion 103c. Note that although the boundary between the intermediate portion 103b and the pressed portion 103c is indicated by a broken line in the figure, this broken line does not indicate a position that strictly separates the intermediate portion 103b and the pressed portion 103c from each other. This broken line is drawn for the purpose of illustration so that the function of the intermediate portion 103b and that of the pressed portion 103b can be easily discussed in the present specification.

In this variation, there is a first clearance space on the left of the rising portion 103, but there is no second clearance space on the outer side of the intermediate portion 103b. The rising portion 103a includes a portion (a non-uniformly-shaped portion) near the intermediate portion 103b where the inner circumferential surface is depressed and the thickness is smaller than other portions of the intermediate portion 103b.

As the screw coupling between the fitting body 101 and the nut 102 is tightened from the finger-tight state, a pressing portion 102a of the nut 102 presses the pressed portion 103c of the ferrule 103 in the axial direction as shown in FIG. 14B. The rising portion 103a of the ferrule 103 is pressed in the axial direction and rises due to deformation of primarily the portion thereof having a smaller thickness. In this process, the outer diameter of the intermediate portion 103b does not hardly increase. As the rising portion 103a rises, a rotational motion occurs in a front end portion 103d of the ferrule 103, and the inner circumference is driven to bite into the outer circumferential surface of the pipe 95 based on the principle of leverage, with the outer circumference of the front end portion 103d as the fulcrum and the inner circumference as the point of load.

Thus, it is possible to cause a rotational motion in the front end portion 103d and drive the inner circumference to bite into the outer circumferential surface of the pipe 95 based on the principle of leverage, as long as there is a first clearance space 105a on the outer side of the rising portion 103a for allowing the rising portion 103a to rise, even if there is no second clearance space on the outer side of the intermediate portion 103b of the ferrule 103, in the finger-tight state.

Note that although this variation is directed to an example where the surface of the pressed portion 103c of the ferrule 103 and the surface of the pressing portion 102a of the nut 102 to be in contact with each other are both a flat surface perpendicular to the central axis, the present invention is not limited to this example. As another example, those surfaces do not need to be perpendicular to the central axis. Moreover, those surfaces do not need to be flat surfaces. For example, there may be a depressed portion in the pressed portion 103c of the ferrule 103, while there is a protruding portion at a position of the pressing portion 102a of the nut 102 corresponding to the depressed portion. Alternatively, the pressed portion 103c of the ferrule 103 may be a flat surface, while there is a protruding portion in the pressing portion 102a of the nut 102.

Although this variation is directed to an example where the rising portion 103a of the ferrule 103 is provided with a portion of a smaller thickness therein so as to make it easier for a rotational motion to occur in the front end portion 103d, the present invention is not limited to this example. With the first clearance space, even if the ferrule 103 has a uniform thickness, the rising portion 103 rises when pressed by the nut 102 in the axial direction, thereby causing a rotational motion in the front end portion 103d.

Moreover, in this variation, the thickness of the intermediate portion 103b of the ferrule 103 is set to be greater than the rising portion 103a so as to prevent the outer diameter of the intermediate portion 103b from increasing when pressed by the nut 102 in the axial direction. However, the present invention is not limited to this example. As another example, the ceiling formed by the inner circumference of the nut 102 may prevent the outer diameter of the intermediate portion 103b of the ferrule 103 from increasing. In such a case, the ceiling may from a cylindrical inner circumferential surface, and one or more annular protruding portions may be provided at a position on the inner circumference of the nut 102 corresponding to the intermediate portion 103b of the ferrule 103 so as to prevent the outer diameter of the intermediate portion 103b from increasing.

Although the embodiment of FIGS. 2 and 3 is directed to an example where the pressing portion 12a forms an acute angle with the outer circumferential surface of the pipe 95 along a cross section that includes the central axis, the present invention is not limited to this. As another example, the pressing portion 12a may be perpendicular to the outer circumferential surface of the pipe 95. If the pressing portion 12a of the nut 12 is perpendicular, a force is efficiently applied on the pressed portion 13d of the ferrule 13 in the axial direction, thereby also making it easier to generate a force deriving therefrom that increases the inner diameter and the outer diameter of the intermediate portion 13e of the ferrule 13. As a result, it is easier for a rotational motion to occur in the front end portion 13a of the ferrule 13.

Although the embodiment of FIGS. 2 and 3 is directed to an example where the nut 12 presses the pressed portion 13d of the ferrule 13 in the axial direction, and the fitting body 11 and the front end portion 13a of the ferrule 13 come into contact with each other, thereby making the rising portion 13c of the ferrule 13 rise toward the tapered inner circumferential surface 11a of the fitting body 11, the present invention is not limited to this example. As another example, the rising portion 13c and the pressed portion 13d of the ferrule 13 may be provided in reversed positions. In such a case, the nut 12 includes a tapered inner circumferential surface, similar to the tapered inner circumferential surface 11a of the fitting body 11 of FIG. 2, to be in contact with the front end portion 13 of the ferrule 13. As the nut 12 presses, with its tapered inner circumferential surface, the rising portion 13c in the axial direction, the fitting body 11 in contact with the pressed portion 13d of the ferrule 13 relatively pushes back the pressed portion 13d. This deforms the ferrule 13, causing a rotational motion in the front end portion in contact with the nut 12, so that the inner circumference is driven to bite into the outer circumference of the pipe 95 based on the principle of leverage, with the outer circumference of the front end portion serving as the fulcrum and the inner circumference as the point of load.

While the present invention has been described above with reference to embodiments and variations, the present invention is not limited to the embodiments and variations. Various changes that can be appreciated by a person of ordinary skill in the art can be made, within the scope of the invention, to the configuration and the details of the present invention as defined in the claims.

This application claims priority based on Japanese Patent Application No. 2012-169271 filed on Jul. 31, 2012, the content of which is herein incorporated by reference in its entirety.

The invention claimed is:

1. A fitting to be connected to a pipe, comprising:
a first member having a through hole constructed and arranged to receive the pipe;
a second member having a through hole constructed and arranged to receive the pipe, the second member being coupled by screw coupling with the first member, with a central axis of the through hole being aligned with a central axis of the through hole of the first member; and
a ferrule having a through hole extending from a first end portion of the ferrule to a second end portion of the ferrule constructed and arranged to receive the pipe, the ferrule including a portion having a greater inner diameter than the first end portion and the second end portion between the first end portion and the second end portion, and the ferrule being placed in an accommodation space formed by an inner circumferential surface of the first member and an inner circumferential surface of the second member, with a central axis of the through hole being aligned with the central axes of the first member and the second member, wherein
the ferrule includes a rising portion including the first end portion, a pressed portion located closer to the second end portion than the rising portion, and an intermediate portion including a portion where an inner diameter is greater than the first end portion and the second end portion, the intermediate portion connecting together the rising portion and the pressed portion;
the first member includes a first tapered inner circumferential surface having a tapered shape, constructed and arranged to be in contact with the first end portion of the ferrule;
the second member includes a pressing portion for pressing at least a portion of the pressed portion of the ferrule;
the accommodation space includes a first clearance space constructed and arranged to accommodate the ferrule therein and to allow the rising portion to rise so as to increase an angle of the rising portion with respect to the outer circumferential surface of the pipe; and
as the screw coupling between the first member and the second member is tightened, the rising portion of the ferrule rises with an outer circumference of the first end portion serving as a fulcrum of the principle of leverage and an inner circumference of the first end portion serving as a point of load of the principle of leverage, causing the inner circumference of the first end portion to rotate to be driven to bite into an outer circumference of the pipe.

2. The fitting according to claim 1, wherein the accommodation space has a second clearance space for accommodating the ferrule therein and further allowing an outer diameter of the intermediate portion to increase and allowing the rising portion to rise so as to increase an angle of the rising portion with respect to the outer circumferential surface of the pipe.

3. The fitting according to claim 1, wherein as the screw coupling between the first member and the second member is tightened after a finger-tight state, a first force applied from the second member in an axial direction and a second force deriving from the first force and acting to widen the intermediate portion outwardly cause the pressed portion and the first end portion of the ferrule to come closer to each other, thereby causing the rising portion to rise, and driving the inner circumference of the first end portion to bite into the outer circumference of the pipe.

4. The fitting according to claim 3, wherein at least a portion of a stage during which the screw coupling is tightened, the inner circumference of the first end portion bites into the outer circumference of the pipe while moving back in an opposite axial direction to a direction of the first force.

5. The fitting according to claim 1, wherein when the screw coupling between the first member and the second member is in a finger-tight state, an outer circumferential surface of the rising portion of the ferrule forms a first angle with respect to the first tapered inner circumferential surface along a cross section that includes the central axis; and a ceiling surface of the accommodation space provided by the first member or the second member is in contact with the intermediate portion whose outer diameter has increased, with the rising portion of the ferrule having risen by the first angle.

6. The fitting according to claim 1, wherein a thickness of the first end portion of the ferrule is less than a length of the rising portion.

7. The fitting according to claim 1, wherein the outer circumference of the first end portion of the ferrule is R-chamfered.

8. The fitting according to claim 1, wherein the pressing portion of the second member has a second inner circumferential surface, which is an inner circumferential surface having a tapered shape, to be in contact with the second end portion of the ferrule; and when the screw coupling between the first member and the second member is in a finger-tight state, an outer circumferential surface of the pressed portion of the ferrule forms a predetermined second angle with respect to the second inner circumferential surface along a cross section that includes the central axis.

* * * * *